July 8, 1952     F. L. JOY     2,602,191
MOLD MANDREL
Filed May 8, 1951     2 SHEETS—SHEET 1
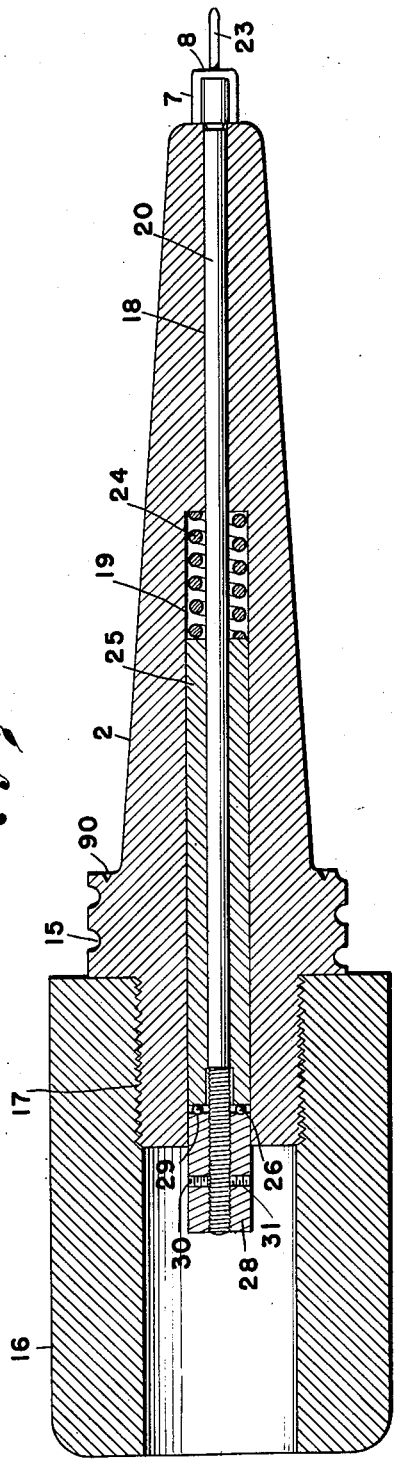
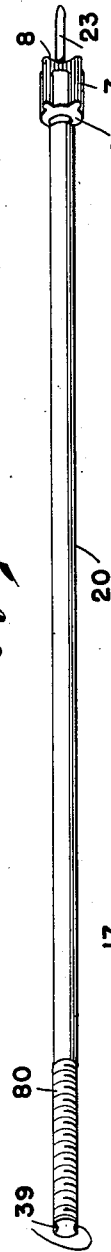
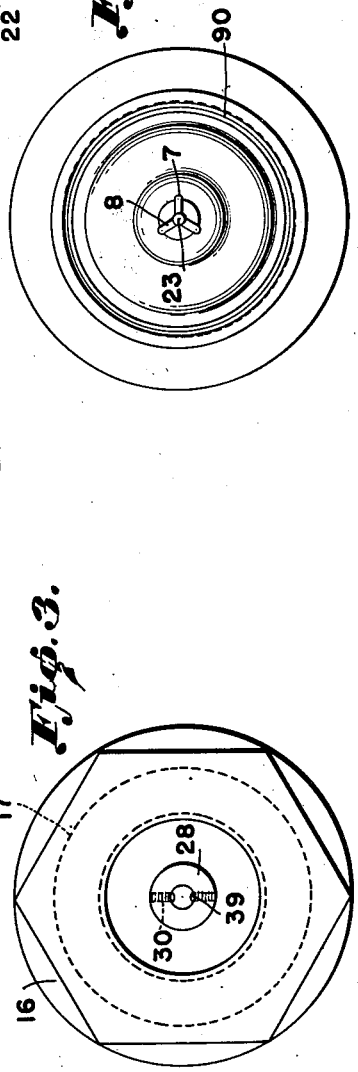
INVENTOR
F. L. JOY
BY L. M. Mantell
ATTORNEY

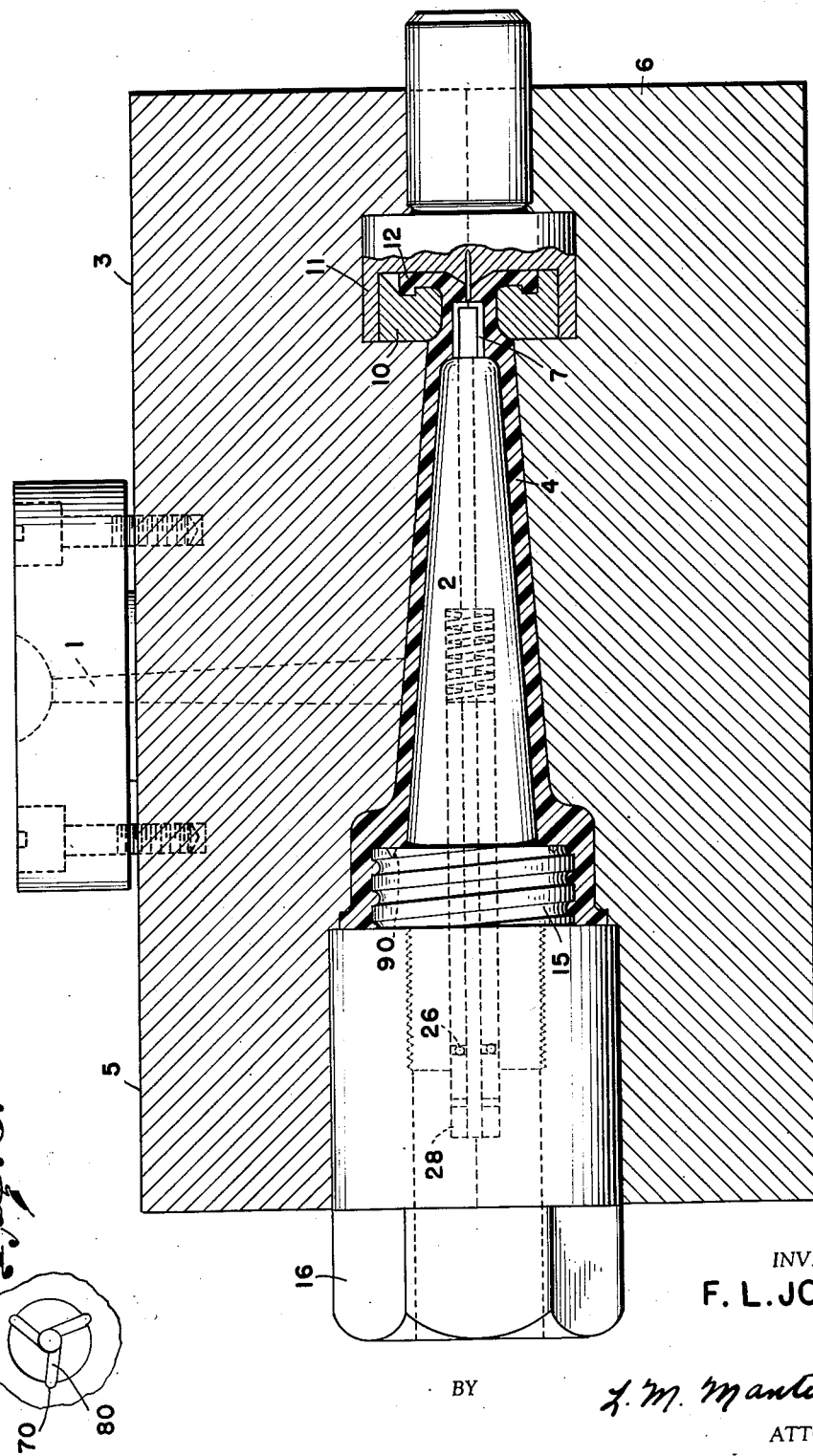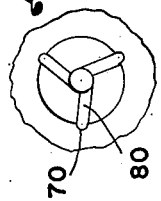

Patented July 8, 1952

2,602,191

UNITED STATES PATENT OFFICE 2,602,191

MOLD MANDREL

Fred L. Joy, Ripley, Miss.

Application May 8, 1951, Serial No. 225,253

5 Claims. (Cl. 18—45)

(Granted under the act of March 3, 1883, as amended April 30, 1928; 370 O. G. 757)

The invention herein described may be manufactured and used by or for the Government of the United States of America for governmental purposes throughout the world without the payment to me of any royalty thereon.

I hereby dedicate the invention herein described to the free use of the people in the territory of the United States to take effect on the granting of a patent to me.

This invention relates to a mold mandrel. It particularly relates to a mold mandrel capable of being used for injection molding of an organic plastic spray nozzle unit.

The spray nozzle unit particularly contemplated here possesses a spraying tip having internal longitiudinal flutings adjacent to and extending below the bore, and also has an internally screw-threaded cap at the other end. After hardening of the plastic about the mandrel, in the molding process, the operation of unscrewing the nozzle unit casting from the madrel must be done with care to avoid damage to or distortion of the slots formed in the casting by the flutings, and of the calibrated bore. In the assembled sprayer the longitudinal flutings provide longitudinal and transvere or tangential air passages or slots leading to the bore; see the companion application of Ryberg, Burney, and Joy for Acid Metering and Atomizing Nozzle, Serial No. 199,904, filed on December 8, 1950, now Patent No. 2,573,731. The assembled sprayer consists of the nozzle unit, the plastic bottle, and the liquid tube fitting up into the nozzle.

A primary object of this invention is to make possible the molding of a unit in one operation with a single mold where both longitudinal and rotational withdrawal of the casting from the mold is involved. This obviates the need for making several molds and the subsequent assembly of a number of parts to make the unit. The invention makes possible the rotation and partial withdrawal of a threaded portion of a mandrel assembly without disturbing another element in the assembly, which element is nevertheless supported and guided as a part of the mandrel assembly. It also makes possible the molding of a delicate section having longitudinal lines, with critical tolerances, in a single molding shot.

In the preferred embodiment of my invention these purposes are achieved by means of a sprin-loaded ball thrust bearing which permits a longitudinally fluted element of the madrel to remain in place in the newly-formed soft plastic material until about one-fourth inch withdrawal of the threaded portion of the mandrel has been accomplished. The spring then causes the longitudinal element to snap out, thus leaving clean sharp surfaces and edges.

One form of the invention is illustrated in the drawings in which:

Figure 1 is a longitudinial section of the mold mandrel;

Figure 2 is a three dimensional view of the fluted unit which must be withdrawn axially from the casting;

Figure 3 is a left end view of Figure 1;

Figure 4 is a right end view of Figure 1;

Figure 5 is a longitudinal section of an assembled mold and a modified form of mold mandrel, the spray nozzle casting being in place between the two;

Figure 6 is an end view of another form of fluted unit, in which the flutings are tangential to the central bore forming pin, to produce a nozzle casting having air-passage slots tangential to the bore.

The injection molding steps are conventional. The process consists of feeding a molding powder, such as polyethylene, in the form or granules into a heating cylinder (not shown) provided with a discharge nozzle and a compression piston or plunger. When the heated material is ready to flow, a single quick stroke of the piston forces the plastic mass through a nozzle (not shown) of the heating cylinder into passage 1 and into the mold cavity between the mold mandrel 2 and the die block 3, filling it instantly. The mold temperature is lower than the hardening point of the material, hence the mold rapidly absorbs heat from the soft plastic, resulting in hardening to a spray nozzle casting 4. The upper half 5 of the block 3 is then separated from the lower half 6. When it is desired to form an anti-drip disc or shield 12 on the end of the nozzle, separable blank elements 10 and 11 are provided, as shown in Figure 5. These can be removed from the casting at this stage.

The solid casting 4 must now be unscrewed from the mandrel without damage to the longitudinal slots formed by the longitudinal ridges or flutings 7 and the transverse slots formed by the transverse edges 8 of the flutings. When the modified nozzle of Figure 6 is employed transverse tangential slots are formed by edges 80 of flutings 70.

The mandrel assembly comprises a conical mandrel 2 having screwthreads 15 at the left. These threads form a corresponding thread in the casting, as shown in Figure 5. Hexagonal head 16 is screwed upon the mandrel at threads 17.

Threads 17 are of opposite hand to threads 15 to prevent unscrewing of the head when the casting is unscrewed from threads 15. A grove 90, cut in the mandrel, creates a ridge on the seat making a better seal between the unit and the receptacle to which attached. This eliminates the need for a gasket and at the same time compensates for small irregularities in the receptacle. Mandrel 2 has an axial bore 18 having an enlarged diameter at 19.

The element which must be removed with snap action from the casting is the integral unit 20, 22, 23 shown in Figure 2. Upon the right end of rod 20 is fixedly mounted the member 22 carrying flutings 7. Axial pin 23 provides the central bore in the spray nozzle casting, as shown in Figure 5. The pin 23 and the flutings 7—8 must, upon withdrawal from the casting, leave smooth, clean surfaces and sharp edges, and provide air slots and a central bore true to measurement, with close tolerances. It is therefore imperative that all of these movements be done accurately and in their proper sequence. The section 22—23 must be withdrawn longitudinally instantly to prevent damage to the edges of the soft plastic. This is accomplished by means of a spring-loaded thrust bearing.

In assembling the mold mandrel unit, the rod 20 is inserted into bore 18 through the right end. Compression spring 24 is placed in position in the enlarged portion of the bore. Smooth bored sleeve 25 is then slid into position about rod 20 and against the spring. It is preferred that there be clearance between threads 80 and the bore of the sleeve. Ball bearings 26 fit into grooves 29 formed in the adjacent end faces of sleeve 25 and adjusting nut 28, and eliminate friction between them. Nut 28 is screw-threadedly mounted upon the threads 80 of the left end of rod 20. By turning nut 28 end pressure is applied to the sleeve through the thrust ball bearing 29. In this way the initial compression of spring 24 can be adjusted. The adjusting nut is then locked in position on the rod by tightening set screw 30, in threaded bore 31, against the groove 39 in rod 20 or by any other conventional locking means permitting longitudinal adjustment, such as a pin screwed through a threaded bore in rod 20 and having an end in a longitudinal slot in nut 28.

When the mandrel is unscrewed from the casting the spring 24 compresses about $\frac{1}{16}''$ and then snaps back into place. The initial compression of the spring, together with the slight and relatively unimpeded rotational displacement of the unit 20—22—23—28 with respect to the mandrel 2 and sleeve 25, under the low friction of the ball thrust bearing, permits the fluted element 22 and the pin 23 to remain in place in the newly-formed plastic casting without any relative rotational displacement between the two, until about a one-fourth inch withdrawal of the threaded portion 15 of the mandrel has taken place. The spring then causes the fluted element 22 and the pin 23 to snap out of the casting. Consequently, there is no distortion of the slots that have been formed in the casting about the flute element. In other words, the spring loading makes it possible for the flutes 7 to follow the nozzle of the casting outwardly until enough spring pressure is developed to instantly snap the flutes out of the casting. The spring 24 has the additional useful function of maintaining a positive seal between element 22 and the right tip of the mandrel, to prevent entry of the hot plastic.

While the invention has been particularly described in relation to the molding of a spray nozzle, it has obvious general application to any molding application where one portion of a mandrel unit must be removed by rotation while a second portion of the same unit must be removed without any relative rotary motion between the casting and said second portion.

Having thus described my invention, I claim:

1. In a mold mandrel assembly for making an organic plastic casting, the mandrel assembly having a circumferentially extending screw threaded part and a part separable therefrom having a longitudinally disposed edge, adapted respectively to form a screw thread and a longitudinal deformation on the resulting casting; the improvement comprising: a mandrel having an axial bore, a rod extending in said bore, means attached to said rod and external to said mandrel providing said longitudinally disposed edge, spring means operatively positioned to apply pressure to the rod in a direction longitudinal to the rod and away from the longitudinally edged part, a nut mounted upon the rod and adjustable longitudinally thereof to determine the degree of compression of the spring and anti-friction means operatively positioned between the spring and the adjusting nut, whereby upon unscrewing the mandrel out of a casting the longitudinally edged part follows the casting in the opposite direction until enough spring pressure is developed to instantly snap the longitudinally edged part out of the casting, so that the longitudinally edged part is permitted to remain in place in the newly-formed plastic without any relative rotational displacement between the said edged part and the casting for a short space of time during the initial unscrewing operation and is thereafter snapped out as aforesaid.

2. A mold mandrel assembly for use in making an organic plastic casting, comprising a mandrel having an axial bore and a screw thread transverse to its axis, a rod rotatably mounted in the bore, means affixed to the rod and external to the mandrel and provided with an edge which is non-parallel to the screw-thread, the screw-thread and said edge being adapted to be exposed to, and to be embedded, in the plastic in the casting operation, a compression spring operatively mounted to draw the said means toward said mandrel, the spring acting in a direction longitudinal to the rod and axial bore, a nut mounted upon the rod and adjustable in position longitudinally thereof to determine the degree of compression of the spring, and anti-friction means operatively mounted with respect to said nut and said spring to facilitate their angular displacement with respect to each other, whereby rotational withdrawal of the casting from the said screw-thread on the mandrel is permitted without disturbing the said edge and is followed sequentially by withdrawal of the casting from the said edge.

3. A mold mandrel assembly for use in making an organic plastic casting, comprising a mandrel having an axial bore and a screw-thread transverse to its axis, a rod rotatably mounted in the bore, means affixed to the rod and external to the mandrel and provided with an edge which is non-parallel to the screw-thread, the screw-thread and said edge being adapted to be exposed to, and to be embedded, in the plastic in the casting operation, a compression spring operatively mounted to draw the said means toward said mandrel, the spring acting in a direction longitudinal to the rod and axial bore, a nut mounted upon the rod and adjustable in position longitudinally thereof to determine the degree of compression of the spring, and anti-friction means operatively mounted with respect to said nut and said spring to facilitate their angular displacement with respect to each other, whereby rotational withdrawal of the casting from the said screw-thread on the mandrel is permitted without disturbing the said edge and is followed sequentially by withdrawal of the casting from the said edge; and in which the mandrel assembly is a spray nozzle forming unit, the means affixed to the rod comprising a longitudinally fluted element the flutes of which have longitudinal and transverse edges adapted to become embedded in the plastic to form internal longitudinal and transverse slots in the tip of the nozzle, the element also carrying a longitudinally directed pin positioned to form a bore in the tip of the spray nozzle casting.

4. The apparatus of claim 1 in which the part having the longitudinally disposed edge has a transverse face which is positioned to seal an end of the bore of the mandrel against hot plastic, the spring being positioned to force the said face toward said end.

5. The apparatus of claim 1 in which the assembly unit is a spray nozzle forming mandrel assembly, the separable part comprising a longitudinally fluted element the flutes of which have longitudinal and transverse edges adapted to become embedded in the plastic to form internal longitudinal and transverse slots in the tip of the nozzle, the separable part also carrying a longitudinally directed pin extending away from the tip of the mandrel and away from the flutes, the pin being positioned to form a bore in the spray nozzle casting which bore communicates with said transverse slots.

FRED L. JOY.

REFERENCES CITED

The following references are of record in the file of this patent:

UNITED STATES PATENTS

| Number | Name | Date |
|---|---|---|
| 694,220 | Webster | Feb. 25, 1902 |
| 2,047,379 | Matson | July 14, 1936 |
| 2,079,393 | Benge | May 4, 1937 |
| 2,217,661 | Anderson | Oct. 15, 1940 |
| 2,336,212 | Baron et al. | Dec. 7, 1943 |
| 2,363,808 | Sayre | Nov. 28, 1944 |